Sept. 11, 1934. W. SIX ET AL 1,973,360
DEVICE FOR SOUND REPRODUCTION
Filed Dec. 11, 1930
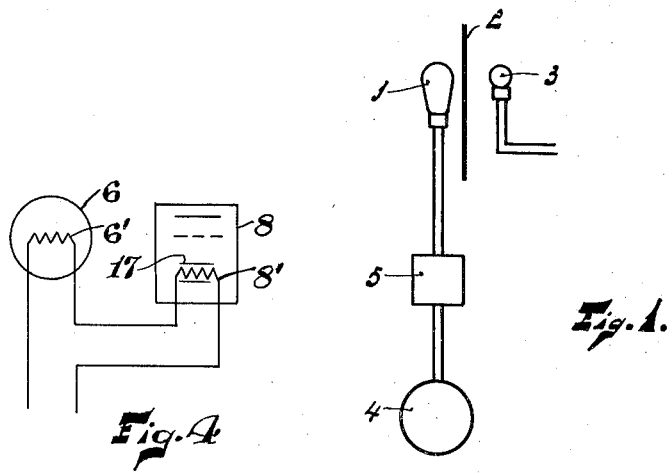
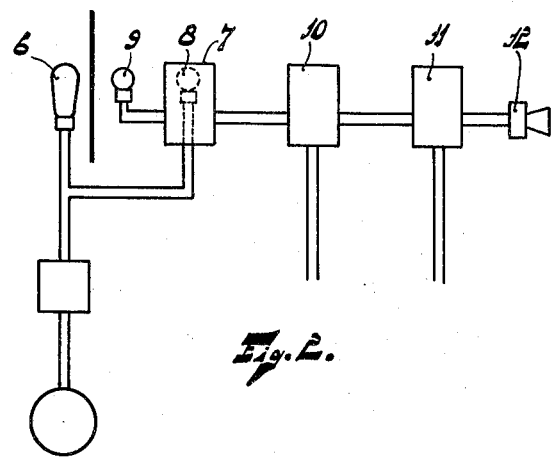
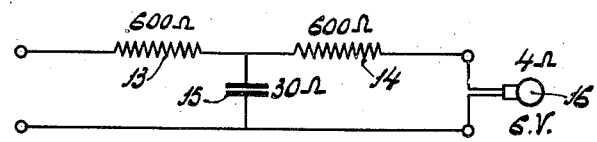
Inventors:
W. Six & W. Metzelaar, Patented Sept. 11, 1934

1,973,360

UNITED STATES PATENT OFFICE 1,973,360

DEVICE FOR SOUND REPRODUCTION

Willem Six and Willem Metzelaar, Eindhoven, Netherlands, assignors to N. V. Philips' Gloeilampenfabrieken, Eindhoven, Netherlands Application December 11, 1930, Serial No. 501,643
In the Netherlands February 21, 1930

2 Claims. (Cl. 179—100.3)

The invention relates to a device for use in talking film installations. This term includes the installation in which the sound records together with the records for the image reproduction are or are to be provided on one film as well as the case in which said records are or are to be registered on separate films.

For the sound reproduction of such films use has hitherto been made, as is well known, of exciter lamps of absolutely constant luminous intensity which is caused to vary by the sound records on the travelling film in such manner that the modulated rays of light passing through the film are capable of producing such variations in the electrical properties of a light sensitive cell as correspond to the sound records. The necessity of an absolute constancy of the exciter lamp was presumed in this case, as the opinion prevailed that, due to the great amplification obtained by the amplifiers connected behind the light-sensitive cell, fluctuations of the luminous intensity give rise to a troublesome humming noise in the loud-speaker serving for the reproduction of the sound recorded on the film.

In the device according to the invention the exciter lamp is fed by a rectified, smoothed mono- or polyphase alternating current. Wherever hereinafter mention is made of the feeding of lamps or valves this term has to be understood to mean the feeding of the incandescent bodies of these lamps or valves.

The present invention is based on the applicants' view that an absolute constancy of the luminous intensity of the exciter lamp is not necessary. It has been found that small deviations are allowable on the condition that care should be taken to ensure that these deviations are kept so small that the humming noise produced thereby during the reproduction is small relatively to the other humming noises produced in the loudspeaker, which latter noises are always present inter alia due to the anode feeding of the various amplifier valves with rectified alternating current or to the alternating current feeding of indirectly heated cathodes and the like.

As exciter lamp use is preferably made of an incandescent lamp because the heat capacity of the filament may contribute to further decrease the voltage fluctuations remaining behind after the rectification.

In some cases it is possible to feed not only the exciter lamp but also the first or more of the amplifier valves connected directly behind the light sensitive cell, with the same smoothed rectified alternating current. It is evident that the number of valves fed in this manner must be chosen in accordance with the requirement that the humming noise produced thereby in the loudspeaker should be so small that it does not predominate relatively to the humming noises produced by other causes.

It is advisable to connect in series the incandescent bodies of the exciter lamp and of the amplifier valves fed with rectified alternating current for with parallel-connection there exists the danger that, for example if one of the incandescent bodies should break, the tension across the other incandescent bodies obtains so high a value that the latter are also damaged.

In the talking film installations according to the prior art this expedient was not possible, due both to the fact that the exposure lamp was invariably fed with direct current while in some cases the amplifier tubes were heated with smoothed, rectified alternating current, and to the fact that the current for the filament of the exposure lamp ranged from 5 to 6 amperes, while the current for the filaments of the amplifier tubes was between 1 and 1½ amperes.

According to the invention the filament of the exposure lamp has been so dimensioned that for the required luminous intensity it requires the same current as the filaments of the amplifier tubes. Consequently, the aforesaid series connection is possible, while at the same time advantage can be taken of the fact that the exposure lamp and the amplifier tubes are fed with the same kind of current.

The series connection of the filaments of amplifier tubes in radio sets fed with smoothed rectified alternating current has already been proposed, but the series connection of the filaments of the exposure lamp and the amplifier tubes in talking film installations and the like, is a new object forming the subject matter of the present invention.

The invention will be more clearly understood by referring to the accompanying drawing which represents, by way of example, some embodiments thereof. In the drawing:

Figure 1 represents diagrammatically part of such a device.

Figure 2 shows another mode of execution of the device and

Figures 3 represents a diagram of a smoothing device for use with the device according to the invention.

Fig. 4 is a diagrammatic view showing some details of Fig. 2.

Referring to Figure 1, 1 denotes an incandescent lamp serving as an exciter lamp for the sound records made on a film 2. The variations of luminous intensity produced by the sound records act on a light sensitive cell 3 which may be connected to the input circuit of an amplifier. The lamp 1 is fed with rectified and smoothed alternating current obtained with the aid of a rectifier 4 and a smoothing device 5.

With the mode of execution shown in Figure 2 both the exciter lamp 6 and the amplifier valve 8 of the amplifier 7 are fed by the rectified and smoothed alternating current. The lamp 6 and the valve 8 are connected in series by this being meant, as has been stated before, that the incandescent filament of the valve 8, which may be either a filamentary cathode or the heating filament of an indirectly heated cathode, is connected in series with the filament of the lamp 6 so that if one of the filaments should break the other filament is prevented from being damaged due to the increase of tension of the rectifier.

The amplifier 7 serves as intermediate stage between the light sensitive cell 9 and the amplification stages denoted by 10 and 11 because the energy furnished by the light sensitive cell is insufficient to correctly load the input circuit of the amplifier 10. The amplifier valves of the amplifiers 10 and and 11 may be fed either collectively or separately with direct current or with alternating current or rectified and smoothed alternating current. The sound reproduction is effected by the device 12. The actual series connection of the incandescent elements of the exciter lamp 6 and amplifier tube 8 appears from Fig. 4, in which the filament 6' of the lamp 6 is shown in series connection with the heater filament 8' of indirectly heated cathode 17 of the tube 8.

The smoothing device represented in Figure 3 consists of two choking coils 13 and 14 and a condenser 15 which have, with an alternating current frequency of 50 cycles per second, a resistance of 600, 600 and 30 ohms respectively. The exciter lamp 16 connected to the smoothing device has at a tension of 6 volts a resistance of 4 ohms, owing to which across the ends of the filament there will be produced voltage fluctuations which are so small that the humming noises produced thereby in the loudspeaker are not predominant relative to humming noises due to other causes.

What we claim is:

1. A device for use in the reproduction of sound in a sound reproducing installation, comprising a light-sensitive cell, an exciter lamp for irradiating said cell and having an incandescent element, an indirectly heated amplifying tube for amplifying the impulses of said cell and having an incandescible element, a source of smoothed rectified alternating current for feeding the incandescent elements of said exciter lamp and of said amplifying tube, said incandescent elements being connected in series.

2. A device for use in the reproduction of sound in a sound film reproducing installation, comprising a light-sensitive cell, an exciter lamp for irradiating said cell and having an incandescent element, a plurality of indirectly-heated amplifying tubes for amplifying the electric impulses of said cell, each of said tubes having an incandescent element, the incandescent element of the first one of said amplifying tubes being connected in series with the incandescent element of the exciter lamp, a source of smoothed rectified alternating current for said series-connected incandescent elements, and a separate source for the incandescent elements of the remaining tubes.

WILLEM SIX.
WILLEM METZELAAR.